United States Patent [19]

Kurosawa et al.

[11] Patent Number: 5,057,685
[45] Date of Patent: Oct. 15, 1991

[54] OPTICAL ROTATION DETECTOR INCLUDING A DISK HAVING SLITS WITH CONCAVE AND CONVEX PARTS AND METHOD OF MANUFACTURING

[75] Inventors: Ryoichi Kurosawa, Kokubunji; Kozo Taira, Tokyo, both of Japan

[73] Assignee: Kabushiki Kaisha Toshiba, Kawasaki, Japan

[21] Appl. No.: 456,967

[22] Filed: Dec. 26, 1989

[30] Foreign Application Priority Data

| Jan. 4, 1989 [JP] | Japan | 64-15 |
| Jan. 4, 1989 [JP] | Japan | 64-17 |
| Jan. 11, 1989 [JP] | Japan | 1-2929 |

[51] Int. Cl.$^5$ ............................................. G01D 5/34
[52] U.S. Cl. ......................... 250/231.14; 250/237 G; 250/231.16
[58] Field of Search ...................... 250/231.16, 231.14, 250/231.13, 237 G, 201 S; 356/373, 395, 374; 33/706, 707; 341/13, 11

[56] References Cited

U.S. PATENT DOCUMENTS

| 3,360,660 | 12/1967 | Kusch et al. | 250/237 R |
| 4,222,070 | 9/1980 | Howe et al. | 358/128.5 |
| 4,406,939 | 9/1983 | Golker | 219/121.68 |
| 4,644,156 | 2/1987 | Takahashi et al. | 250/231.14 |
| 4,689,485 | 8/1987 | McMurtry | 250/231.16 |
| 4,725,723 | 2/1988 | Shimojima | 250/231.14 |
| 4,757,196 | 7/1988 | Yamada et al. | 250/231.13 |
| 4,780,610 | 10/1988 | Abe | 250/237 G |
| 4,833,316 | 5/1989 | Yoneda | 250/237 G |

FOREIGN PATENT DOCUMENTS 0072378 2/1983 European Pat. Off. .
8301700 5/1983 World Int. Prop. O. .

OTHER PUBLICATIONS

Patent Abstracts of Japan, vol. 10, No. 387 (P-530) (2444) Dec. 25, 1986, & JP-A-61-176817 (Foster Denki K.K.) Aug. 8, 1986.
Patent Abstracts of Japan, vol. 6, No. 252 (P-161) (1130) Dec. 10, 1982, & JP-A-57 149912 (Nippon Denshin Denwa Kosha) Sep. 16, 1982.

Primary Examiner—Davis L. Willis
Assistant Examiner—Michael Messinger
Attorney, Agent, or Firm—Oblon, Spivak, McClelland, Maier & Neustadt

[57] ABSTRACT

A rotation detector includes a rotary disk in which slits are recorded, and a photodetector for reading the slits with a laser beam. The slits is constituted by concave and convex parts having different widths radially formed on one surface of the rotary disk at different intervals. The width of one of the concave and convex parts constituting the slits which has a smaller width or slit interval is set to be smaller than the spot size of the laser beam.

12 Claims, 8 Drawing Sheets

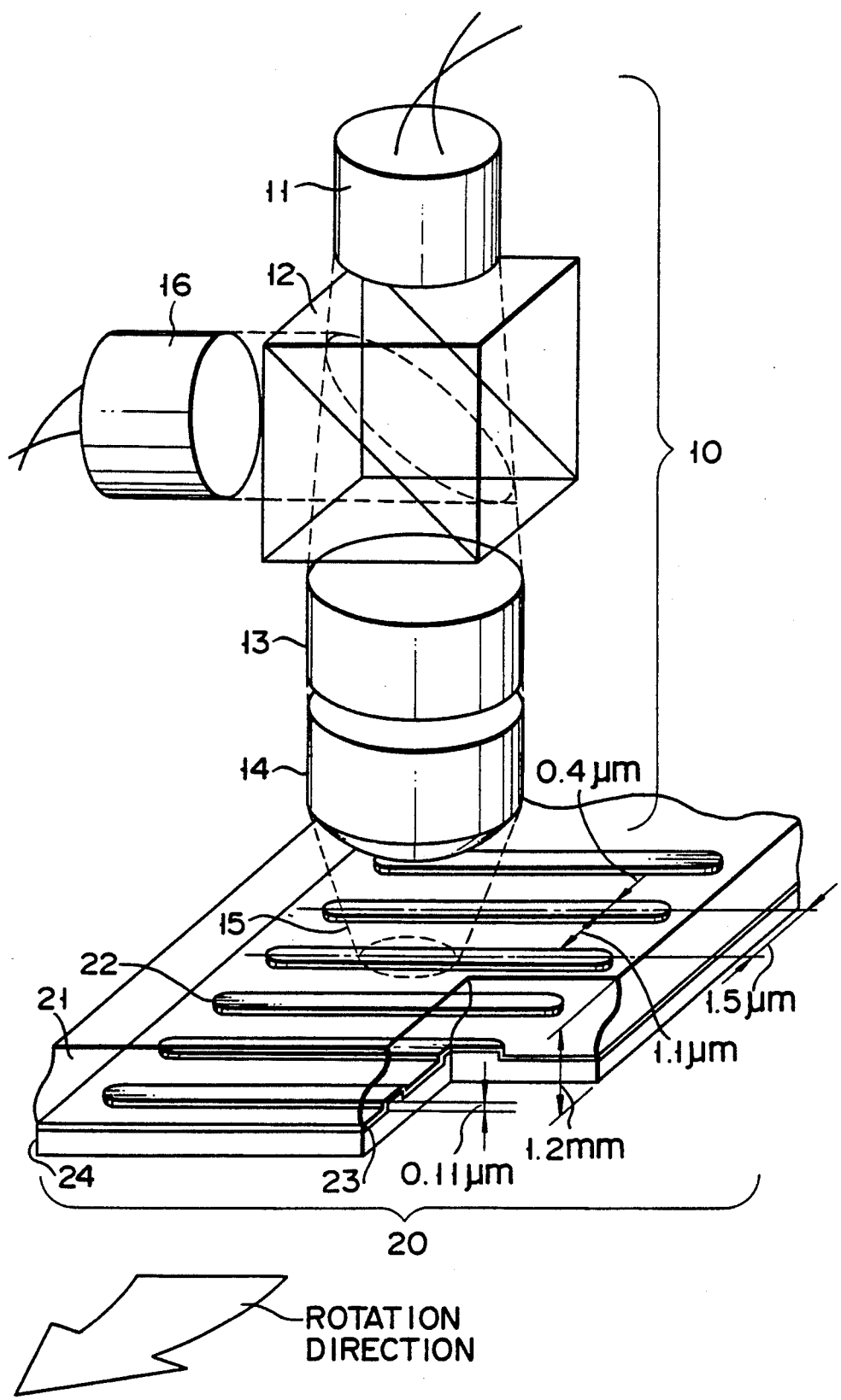
F I G. 1

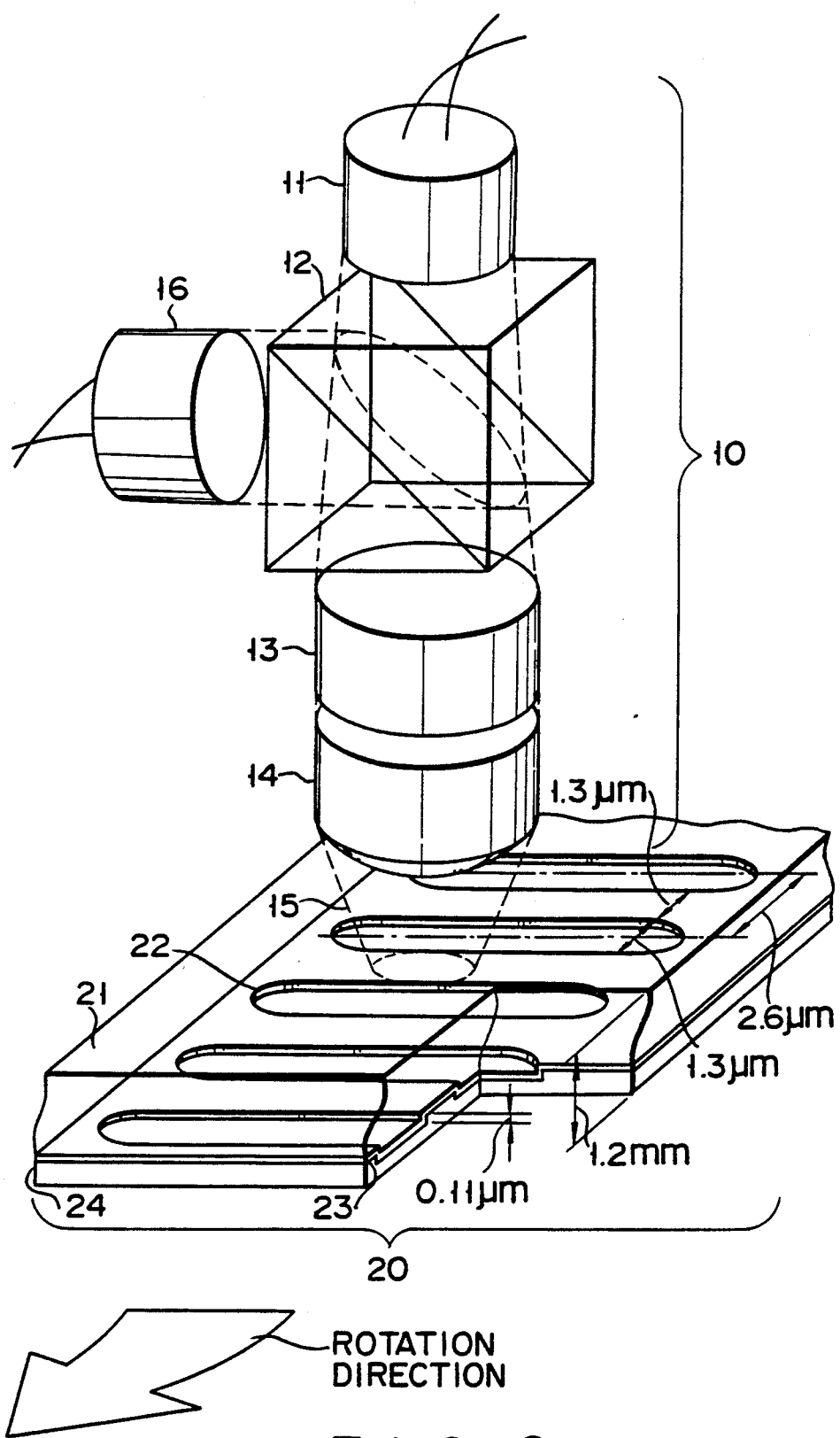
F I G. 6

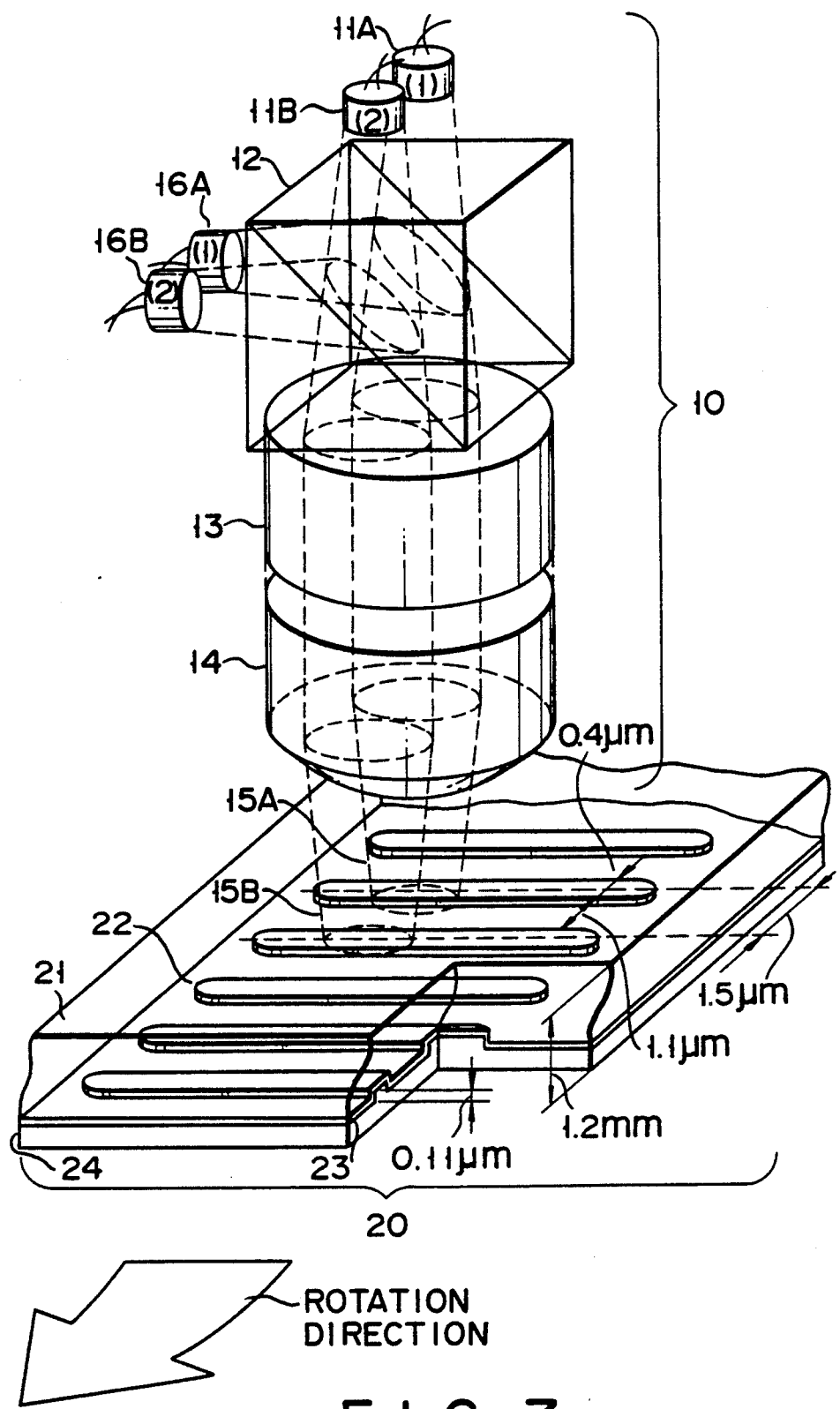
F I G. 7

OPTICAL ROTATION DETECTOR INCLUDING A DISK HAVING SLITS WITH CONCAVE AND CONVEX PARTS AND METHOD OF MANUFACTURING

BACKGROUND OF THE INVENTION

1. Field of the Invention

The present invention relates to a rotation detector for detecting the position, speed, and the like of a rotating object.

2. Description of the Related Art

An optical pulse encoder is known as a typical conventional rotation detector. This encoder includes a disk on which rotating slits are recorded, and a pair of detectors for optically reading the rotation of the rotating slits. The rotating slits are constituted by light-transmitting and light-shielding parts which are alternately arranged on the disk at equal angular intervals in the circumferential direction. The disk is coupled to a rotating object whose rotation is to be detected (a rotating object to be detected). Each detector comprises a light source, stationary slits for detection, and a phototransistor for converting an optical signal into an electrical signal. When light-transmitting parts of the rotating slits and the stationary slits for detection coincide with each other upon rotation of the disk, light from the light source reaches the phototransistor. When light-transmitting and light-shielding parts of these slits coincide with each other, light from the light source does not reach the phototransistor. The motion of the rotating slits stored in the disk is represented by changes in intensity of light emitted from the light source and reaching the phototransistor, and is converted into an electrical signal by the phototransistor.

The stationary slits for detection are respectively shifted from the rotating slits by ¼ the slit interval, and hence electrical signals obtained from the detectors become two-phase signal components having a phase difference of 90°. Since the advance/delay relationship in phase between two-phase signal components obtained from the detectors is reversed in accordance with the rotational direction of the disk, the rotational direction can be discriminated. The above-described encoder is designed to obtain a pulse-like two-phase electrical signal whose amplitude changes once for every rotation of the disk corresponding to one slit. Hence, such an encoder is called a two-phase pulse encoder.

A great deal of attention has recently been paid to a system for driving a robot or the like by direct drive by means of a servo motor without gears instead of driving it by gear-reducing the rotation of a servo motor as in a conventional system. In this system, play, a decrease in rigidity, and the like due to gears need not be considered, and hence a high-speed operation can be performed with high precision. A servo motor used for such a direct drive operation needs to be rotated at very low speed. Therefore, rotation control for this motor requires a rotation detector having a higher resolution than a rotation detector of a motor with gears by a degree corresponding to the reduction ratio of the gears.

In an optical pulse encoder, if the slit interval becomes several tens μm or less, the influences of diffraction of light cannot be neglected, and the interval between a rotating slit and a stationary slit for detection must be greatly decreased. Consequently, mechanical assembly of a rotation detector becomes very difficult (about 6,000 slits must be formed, provided that a disk having a diameter of 10 cm is used and the slit interval is set to be 50 μm).

As a method of recording data at a very high density using a rotary disk, a so-called optical disk system is available, which is used for a CD (compact disk) for recording music or an LD (laser disk) for recording images. This system is designed to optically read pits recorded in a disk with a laser beam. By using this technique of optical disks, a rotation detector having a very high resolution can be obtained.

If this technique of optical disks is used, about 210,000 slits can be formed in a rotary disk having a diameter of 10 cm. A one-phase output rotation detector obtained by this technique has a resolution more than ten times that of a conventional optical pulse encoder.

Although a high-resolution rotation detector can be designed by using this technique, tracking in the radial direction of the disk must be performed to accurately focus a laser beam onto a narrow pit. This requires a mechanism for radially moving an objective lens, and hence the structure is complicated. In addition, since the rotation detector is mounted on a motor or the like, tracking may not be performed because of the influences of vibration. Therefore, it is difficult to increase the reliability of the detector.

Moreover, in order to obtain tow-phase electrical signals for discriminating a rotational direction as in a two-phase pulse encoder, a pair of photodetectors are required and must be arranged in the circumferential direction of the rotary disk at an interval of $N\pm\frac{1}{4}$ times (N is an integer) a slit interval of 1.5 μm. Since the width of each detector in the circumferential direction is at least about 10 mm, the interval between the detectors is 10 mm or more. An error of this interval in the circumferential direction must be sufficiently smaller than 1.5/4 μm with respect to a dimension of 10 mm. Therefore, it is very difficult to realize a very high relative precision.

SUMMARY OF THE INVENTION

The present invention has been made in consideration of the above-described situation, and has as its object to provide a rotation detector which has a high resolution by using a technique of optical disks, and has a simple structure with high reliability.

According to the present invention, there is provided a rotation detector comprising a rotary disk in which slits are recorded, the slits being constituted by concave and convex parts having different widths and radially formed on one surface of the rotary disk, and a photodetector for reading the slits with a laser beam, wherein the width of one of the concave and convex parts constituting the slit which has a smaller width is set to be smaller than the spot size of the laser beam radiated from the photodetector.

In the rotary disk of the rotation detector according to the present invention, although the concave and convex parts have small widths in the circumferential direction, each slit has a sufficiently large length in the radial direction. Therefore, the photodetector requires no tracking function in the radial direction, and no consideration needs to be given to the chance of a reading error due to a tracking failure caused by vibrations or the like.

When the rotary disk is rotated and a laser beam is radiated from the photodetector onto one of concave and convex parts which has a smaller width, since the spot size of the laser beam is larger than the width of the part having a smaller width, laser beam components are reflected by both the concave and convex parts and interfere with each other. As a result, almost no laser beam returns to the photodetector, and an electrical signal having a small amplitude is obtained. In contrast to this, when a laser beam is radiated on one of concave and convex parts which has a larger width, most of the laser beam returns to the photodetector, and hence an electrical signal having a larger amplitude is obtained. Therefore, an electrical signal having one cycle is obtained every time the rotary disk is rotated by a degree corresponding to one slit. Since the slit interval can be reduced, a large number of slits can be recorded, and a rotation detector having a very high resolution can be obtained.

In addition, according to the present invention, there is provided a rotation detector comprising a rotary disk in which slits are recorded, the slits being constituted by concave and convex parts having substantially the same width and radially formed on one surface of the rotary disk, and a photodetector for reading the slits with a laser beam. In this case, the widths of concave and convex parts constituting slits are set to be substantially equal to or larger than the spot size of the laser beam. Since the slit interval can be reduced, a large number of slits can be recorded. An electrical signal having two cycles can be obtained every time the rotary disk is rotated by a degree corresponding to one slit. Therefore, a rotation detector having a very high resolution can be obtained.

Furthermore, according to the present invention, there is provided a rotation detector comprising a rotary disk in which slits are recorded, the slits being constituted by concave and convex parts radially formed on one surface of the rotary disk, and a photodetector for reading the slits with a laser beam, wherein a plurality of laser beams from the photodetector are transmitted through one optical system, and a plurality of electrical signals having different phases are obtained upon rotation of the rotary disk.

In the rotation detector of the present inventor, the same optical system is used for a plurality of laser beams, and hence only one optical system is required and adjustment of the relative position thereof is not required. Therefore, a rotation detector capable of discriminating a rotational direction can be easily realized.

BRIEF DESCRIPTION OF THE DRAWINGS

FIG. 1 is a perspective view showing an optical system of a rotation detector according to the first embodiment of the present invention;

FIG. 6 is a perspective view showing an optical system of a rotation detector according to the fifth embodiment of the present invention FIG. 7 is a perspective view showing an optical system of a rotation detector according to the sixth embodiment of the present invention.

DETAILED DESCRIPTION OF THE PREFERRED EMBODIMENTS

Figure 2:
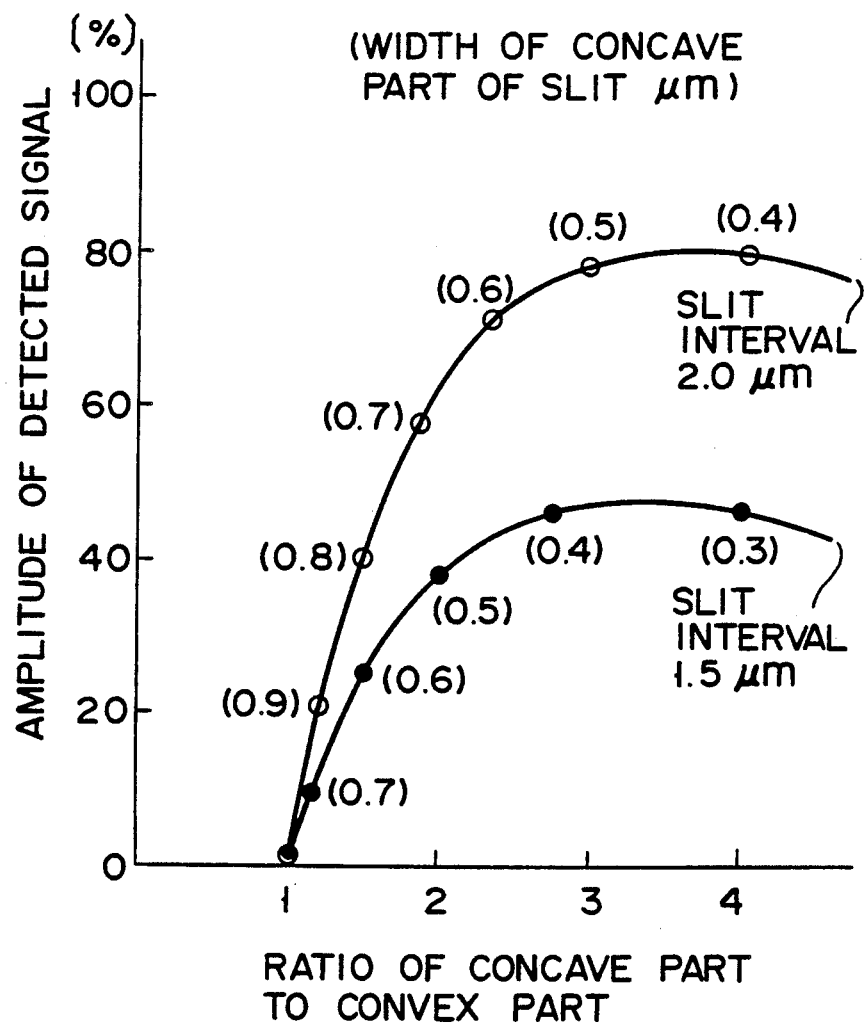
FIG. 2 is a graph showing characteristics of the detector in FIG. 1.

FIG. 1 shows an arrangement of a rotation detector according to the first embodiment of the present invention. The rotation detector is constituted by photodetector 10 and rotary disk 20. FIG. 1 shows an enlarged view of part of rotary disk 20 for the sake of a description. Photodetector 10 has the same arrangement as that of a photodetector (optical pickup) for an optical disk such as a CD (compact disk). Reference numeral 11 denotes a laser diode; 12, a beam splitter; 13, a collimator lens; 14, an objective lens; 15, a laser beam; and 16, a photodiode. Rotary disk 20 is coupled to the rotating shaft of a rotating object to be detected, and is rotated upon rotation of the rotating object. Reference numeral 21 denotes a plastic member; 22, slits; 23, a reflecting film; and 24, a protective film.

Slits 22 are designed such that concave parts (which look like projections because FIG. 1 is a view seen from the reflection side of the surface in which the slits are formed), each having a depth of 0.11 $\mu$m, a width of 0.4 $\mu$m, and a proper length, are radially formed in one surface of plastic member 21 of rotary disk 20 at 1.5-$\mu$m intervals (each of the remaining convex parts has a width of 1.1 $\mu$m), and reflecting film 23 is formed on the surface having the concave and convex parts. That is, slits 22 are constituted by the concave and convex parts.

A laser beam having a wavelength of about 0.78 $\mu$m emitted from laser diode 11 of photodetector 10 is transmitted through the beam splitter and is collimated by collimator lens 13. The collimated light is then radiated on rotary disk 20 from the opposite side to the surface having slits 22 through objective lens 14. The laser beam is adjusted by objective lens 14 so as to be focused onto the position of each slit 22. The spot size of laser beam 15 at the position of slit 22 is reduced to about 1.4 $\mu$m. The laser beam is reflected by reflecting film 23, and returns to photodetector 10. The laser beam then passes through objective lens 14 and collimator lens 13, and its direction is changed by beam splitter 12. The laser beam is finally guided to photodiode 16 to be converted into an electrical signal.

When the center of laser beam 15 coincides with the center of the concave part of slit 22, since the width of the concave part is 0.4 $\mu$m which is smaller than the half of the spot size (about 1.4 $\mu$m) of laser beam 15, a laser beam component reflected by the concave part and laser beam components reflected by the convex parts are mixed together and return to photodetector 10. A laser beam reflected by each concave portion differs in optical path length from a laser beam reflected by each convex part by a length twice the depth of the concave part. Since the depth, 0.11 $\mu$m, of each concave part is set to be ¼ the wavelength of a laser beam which is transmitted through plastic member 21, the laser beams which are respectively reflected by the concave and con vex parts have a phase difference of 180°. Hence, the laser beams cancel each other upon interference. As a result, the amount of laser beams which return to photodetector 10 is greatly decreased, and an electrical signal obtained from photodiode 16 is decreased in amplitude.

When the center of laser beam 15 coincides with the center of a portion between the concave parts of slits 22, i.e., the convex part, since the concave part has a width of 1.1 μm which is substantially equal to the spot size (1.4 μm) of the laser beam, most of the laser beam is reflected by the convex part and returns to photodetector 10. As a result, an electrical signal having a large amplitude is obtained from photodiode 16. The concave and convex parts constituting slits 22 can be converted into the amplitudes of electrical signals and read by photodetector 10 in this manner. An electrical signal whose amplitude changes once every time each slit 22 is rotated by a slit interval (1.5 μm) upon rotation of rotary disk 20 can be obtained.

FIG. 2 shows a relationship between the ratio of the width of each concave part to that of each convex part of the slits of rotary disk 20 and the amplitude (modulation factor) of an electrical signal obtained from photodetector 10 when the spot size of the laser beam is 1.4 μm. If concave and convex parts of slits have the same width (width ratio is 1) as in the case with the slits of the conventional optical pulse encoder, the amplitude of an obtained electrical signal has a very small amplitude. When the concave part of a slit has a width of about 0.4 μm, the amplitude of an obtained electrical signal is increased as the width of a convex part is increased, i.e., the slit interval is increased.

If the width of each concave part is increased, however, the number of slits to be formed in the periphery of a rotary disk is decreased, and the resolution of the rotation detector cannot be increased. Therefore, the width of each convex part is preferably set to be twice or more of the width of each concave part in consideration of the amplitude of an electrical signal obtained as a resolution. With this setting, about 210,000 slits can be formed in a rotary disk having a diameter of 10 cm.

As described above, according to the embodiment of the present invention, a rotation detector having a very high resolution can be obtained, which uses the technique of optical disks such as a CD (compact disk) and an LD (laser disk). If slits consisting of concave and convex parts similar to pits of an optical disk, and a reflecting film are used, tracking in the radial direction is not required, and the structure of the rotation detector can be simplified. As a result, the reliability of the rotation detector can be greatly improved.

In addition, since a concave part and a convex part constituting a slit have different widths, and the smaller width of the widths of the concave and convex parts is set to be smaller than the spot size of a laser beam, an electrical signal whose amplitude greatly changes once for every rotation of the rotary disk corresponding to one slit can be obtained. The slit interval can be reduced to about 1.5 μm, and hence a rotation detector having a resolution more than 10 times that of the conventional optical pulse encoder can be obtained.

Figure 3:
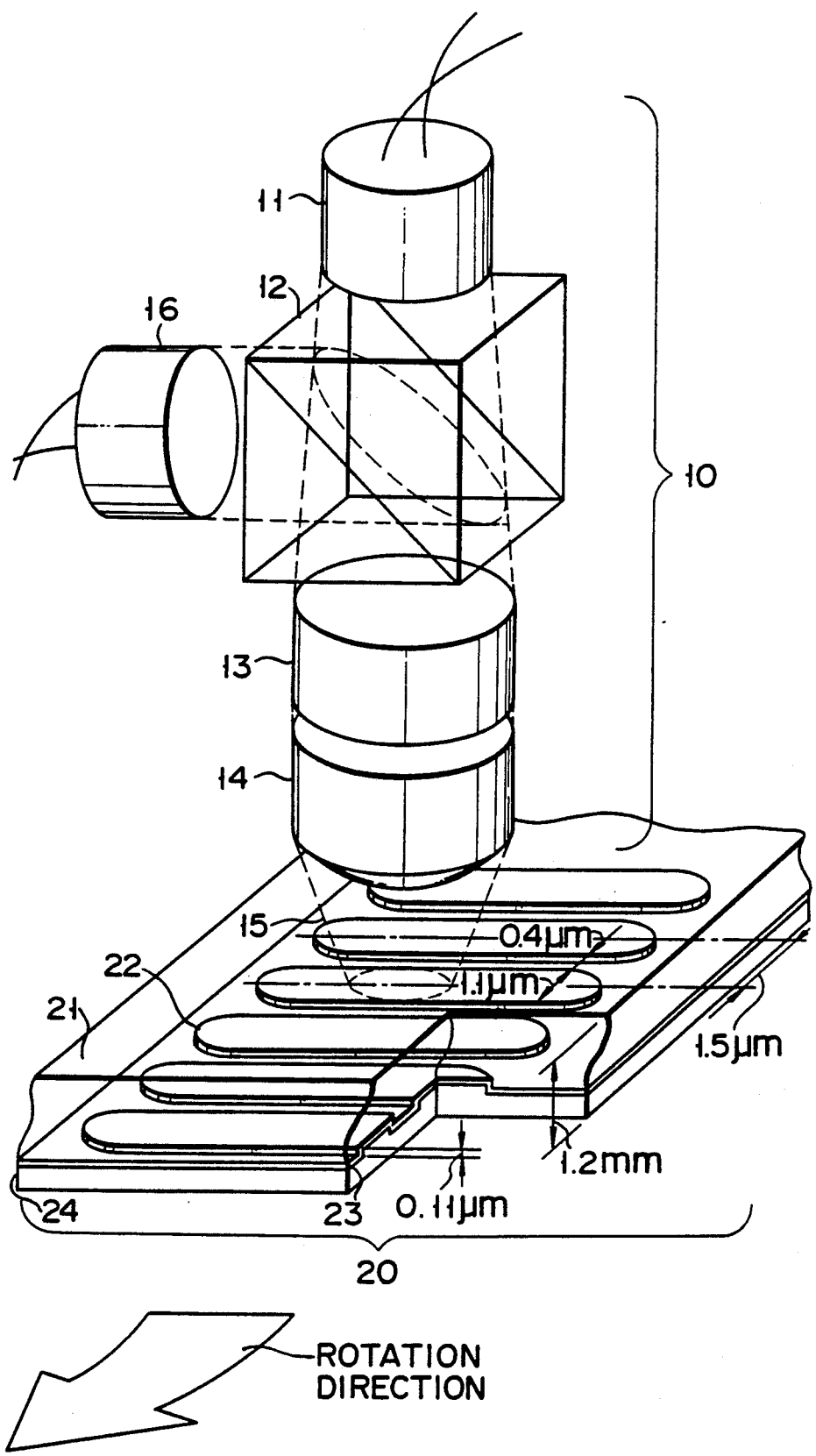
FIG. 3 is a perspective view showing an optical system of a rotation detector according to the second embodiment of the present invention.

FIG. 3 shows an arrangement of the second embodiment of the present invention. Reference numeral 10 denotes a photodetector; and 20, a rotary disk. Photodetector 10 is identical to the one in the first embodiment shown in FIG. 1. Rotary disk 20 has the same arrangement as that of the one in the first embodiment. However, in this rotary disk 20, since a concave part of slit 22 has a width of 1.1 μm, and the slit interval is 1.5 μm which remains the same, the width of a convex part is 0.4 μm. Hence, the relationship in width between each concave part and each convex part of the slits is reversed.

When the center of laser beam 15 radiated from photodetector 10 coincides with the center of the concave part of slit 22, since the width of the concave part is almost equal to the spot size of laser beam 15, most of the laser beam is reflected by the concave part and returns to photodetector 10. As a result, an electrical signal having a large amplitude is obtained.

When the center of laser beam 15 coincides with the center of a portion between the concave parts of slits 22, i.e., the center of a convex part, since the width of the convex part of the slit is not more than ½ the spot size of the laser beam, laser beam components reflected by the convex and concave parts interfere with each other. As a result, an electrical signal having a small amplitude is obtained. Although the relationship in amplitude between electrical signals obtained with respect to the concave and convex parts of the slits is reversed, the convex and concave parts constituting slits 22 are converted into electrical signals alternately having large and small amplitudes and read by photodetector 10 in the same manner as in the first embodiment.

Figure 4:
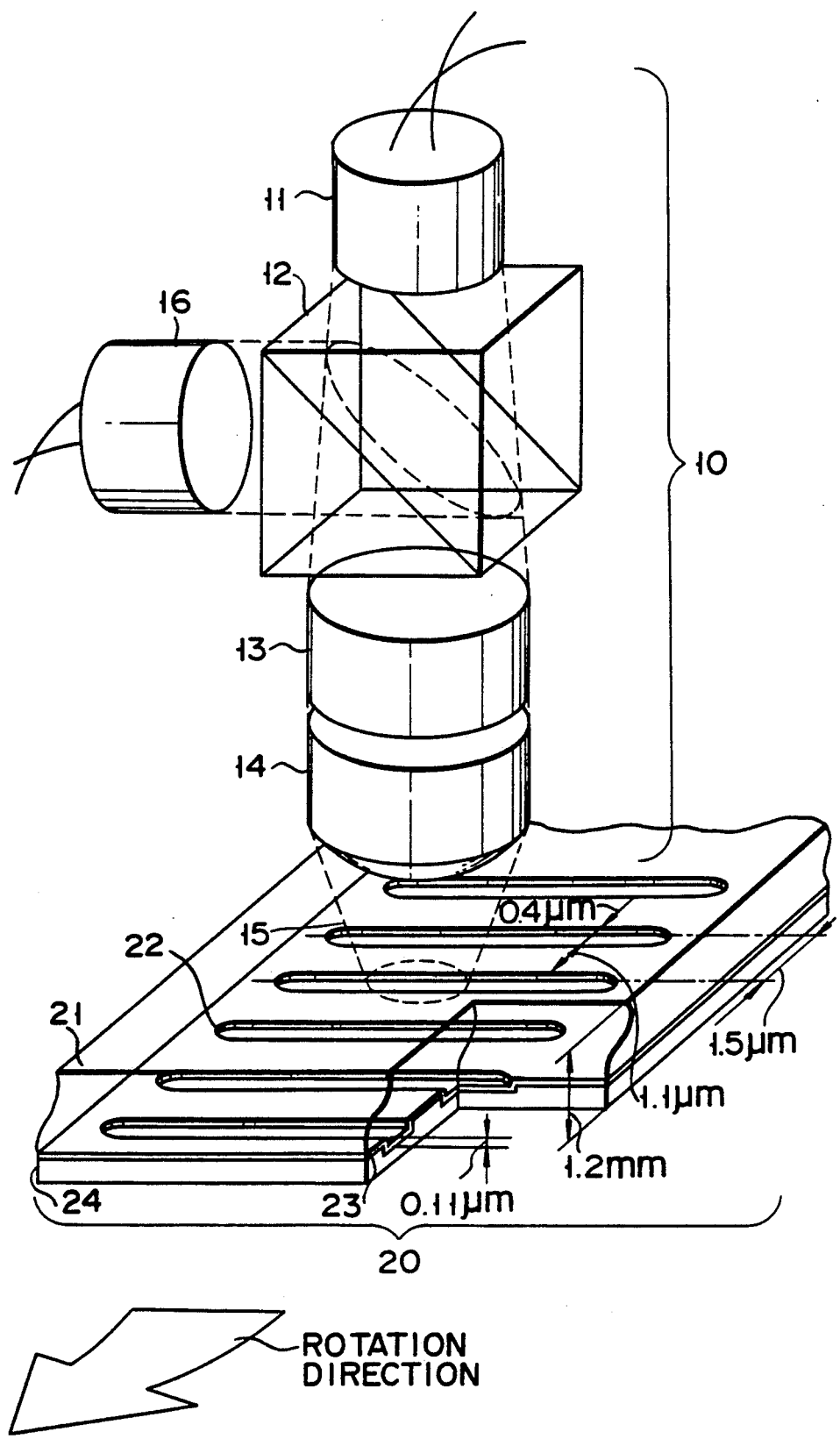
FIG. 4 is a perspective view showing an optical system of a rotation detector according to the third embodiment of the present invention.

FIG. 4 shows an arrangement of the third embodiment of the present invention. Reference numeral 10 denotes a photodetector; and 20, a rotary disk. Photodetector 10 is identical to those in the first and second embodiments. Although rotary disk 20 has the same arrangement as that of each rotary disk in the first and second embodiments, its manufacturing method is different. In this rotary disk, slits 22 are constituted by convex parts (which look like recesses because FIG. 4 is a view seen from the opposite side to the surface having pits). Since the with of each convex part is 0.4 μm and the slit interval is 1.5 μm, the width of each concave part is 1.1 μm. The relationship in width between concave and convex parts of slits is the same as that in the second embodiment.

Similar to the second embodiment, therefore, when the center of laser beam 15 radiated from photodetector 10 coincides with the center of the concave part between the convex parts, since the width of the concave part is almost equal to the spot size of the laser beam, most of the laser beam is reflected by the concave part and returns to photodetector 10. As a result, an electrical signal having a large amplitude is obtained. When the center of laser beam 15 coincides with the center of the convex part of slit 22, since the width of the convex part is not more than ½ the spot size of the laser beam, laser beam components reflected by the convex and concave parts interfere with each other. As a result, an electrical signal having a small amplitude is obtained. The concave and convex parts constituting slits 22 can be converted into electrical signals alternately having large and small amplitudes and read by photodetector 10.

Even if the width of each convex part of slits in the third embodiment is set to be 1.1 μm, and the width of each concave part between the respective convex parts is set to be 0.4 μm (not shown), the concave and convex part of the slits can be converted into electrical signals in the same manner as described above.

In the above-described embodiments of the present invention, the concave and convex parts are formed on the plastic member of the rotary disk and the reflecting film is formed on the resultant surface so as to have the same arrangement as that of a CD (compact disk) or an LD (laser disk). However, concave and convex parts may be formed on a metal disk so as to have a structure allowing direct reflection. Alternatively, a rotary disk may be designed to transmit laser beams without a reflecting film. In this case, the intensities of transmitted laser beams are read by a photodetector by using the phenomenon that the transmitted laser beams are shifted in phase by the concave and convex parts (differences in thickness) formed on the rotary disk and interfere with each other.

Figure 5:
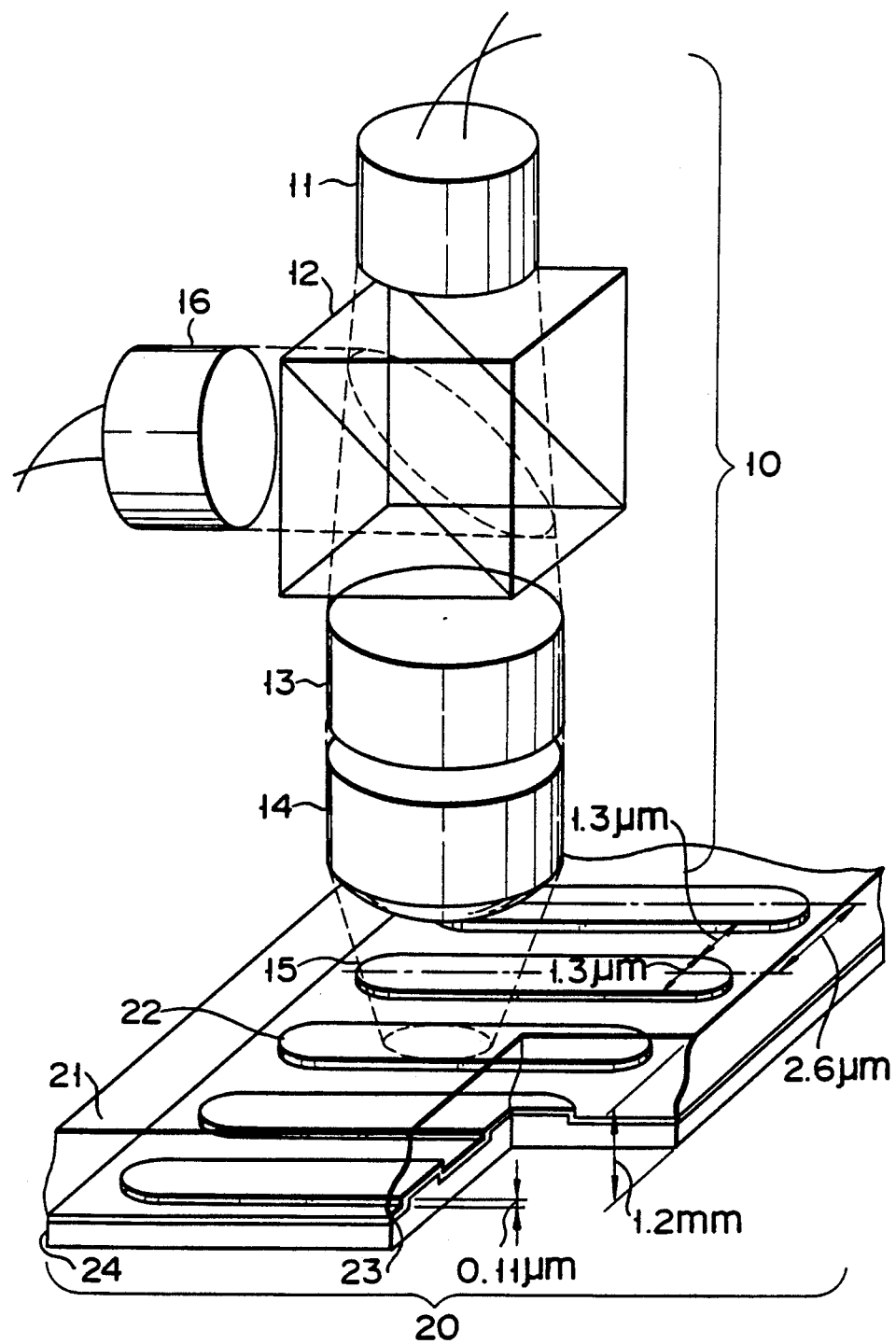
FIG. 5 is a perspective view showing an optical system of a rotation detector according to the fourth embodiment of the present invention.

FIG. 5 shows a modification of the embodiment shown in FIG. 1. Rotary disk 2 is coupled to the rotating shaft of a rotating object to be detected and is rotated upon rotation of the rotating object. Reference numeral 21 denotes a plastic member; 22, slits; 23, a reflecting film; and 24, a protective film. Slits 22 are designed such that concave parts (which look like projections because FIG. 5 is a view seen from the reflection side of the surface in which the slits are formed), each having a depth of 0.11 μm, a width of 1.3 μm, and a proper length, are radially formed in one surface of plastic member 21 of rotary disk 20 at 2.6-μm intervals (each of the remaining convex parts has a width of 1.3 μm), and reflecting film 23 is formed on the surface having the concave and convex parts. That is, slits 22 are constituted by the concave and convex parts.

When the center of laser beam 15 coincides with the boundary between the concave and convex parts of slit 22, the half of the laser beam is reflected by the concave part, and the other half is reflected by the convex part. These two laser beam components are mixed and return to photodetector 10. The laser beam components reflected by the concave and convex parts have a difference in optical path length corresponding to twice the depth of the concave part. Since the depth (0.11 μm) of the concave part is set to be ¼ the wavelength of a laser beam which is transmitted through plastic member 21, the laser beam components reflected by the concave and convex parts are 180° out of phase, and cancel each other upon interference. As a result, the amount of laser beams which return to photodetector 10 is greatly decreased, and hence an electrical signal obtained from photodiode 16 is reduced in amplitude.

When the center of laser beam 15 coincides with the center of the concave or convex part of slit 22, since the width (1.3 μm) of the concave or convex part of slit 22 is almost equal to the spot size (1.4 μm) of the laser beam, most of the laser beam is reflected by the concave or convex part and returns to photodetector 10. As a result, an electrical signal having a large amplitude is obtained from photodiode 16. In this manner, the convex and concave parts constituting slits 22 can be converted into electrical signals alternately having large and small amplitudes and read by photodetector 10. Since one slit has two boundaries defined by the concave parts and the convex part, an electrical signal whose amplitude changes twice for every rotation of slit 22 corresponding to the slit interval (2.6 μm) upon rotation of rotary disk 20 can be obtained.

If the spot size of a laser beam is set to be 1.4 μm, an electrical signal having a large amplitude can be obtained from photodetector 10 by setting the widths of the concave and convex parts of each slit of rotary disk 20 to be 1.4 μm or more. However, if the widths of convex and concave parts are increased, the number of slits which can be formed in the periphery of a rotary disk is decreased, and the resolution of the rotation detector cannot be improved. For this reason, the widths of the convex and concave parts are set to be 1.3 μm which is slightly smaller than the spot size of a laser beam in consideration of the amplitude of an electrical signal obtained as a resolution. With this arrangement, about 210,000 slits can be formed in a rotary disk having a diameter of 10 cm. As a result, an electrical signal having about 420,000 cycles per rotation can be obtained.

It is difficult to form a slit into a perfect rectangular shape as shown in the drawings, and hence the state of reflection of laser beams at concave and convex parts varies depending on the shape of slits. As a result, the amplitudes of electrical signals obtained from a photodetector nonuniformly vary depending on positions at which laser beams are radiated. However, the amplitudes of electrical signals can be made uniform by slightly changing the widths of concave and convex parts.

As described above, according to the embodiment of the present invention, a rotation detector having a very high resolution, which uses the technique of optical disks such as a CD (compact disk) and an LD (laser disk) can be obtained. Since slits consisting of concave and convex parts similar to pits of an optical disk and a reflecting film are used, tracking in the radial direction is not required. In addition, the structure can be simplified, and the reliability of the rotation detector can be greatly improved.

Since the widths of concave and convex parts constituting a slit are set to be substantially the same, and are set to be substantially equal to or larger than the spot size of a laser beam, an electrical signal whose amplitude greatly changes twice every time the rotary disk is rotated by a degree corresponding to one slit can be obtained from the photodetector. In addition, the slit interval can be reduced to about 2.6 μm. As a result, a rotation detector having a resolution more than 10 times that of the conventional optical pulse encoder can be obtained.

FIG. 6 shows an arrangement of another embodiment of the present invention. Reference numeral 10 denotes a photodetector; and 20, a rotary disk. Photodetector 10 is identical to those in the above embodiments. Rotary disk 20 has the same arrangement as that in the embodiment shown in FIG. 5. However, in this arrangement, slits 22 are designed such that convex parts (which look like recesses because FIG. 6 is a view seen from the opposite side to the surface in which the slits are formed), each having a depth of 0.11 μm, a width of 1.3 μm, and a proper length, are radially formed in one surface of plastic member 21 of rotary disk 20 at 2.6-μm intervals (each of the remaining convex parts has a width of 1.3 μm), and reflecting film 23 is formed on the surface having the concave and convex parts. Although the method of forming the slits in the rotary disk is different from that in the embodiment shown in FIG. 5, the widths of the concave and convex parts is 1.3 μm, and the same functions and effects as those in the embodiment shown in FIG. 5 can be obtained.

In the above-described embodiments of the present invention, the concave and convex parts are formed on the plastic member of the rotary disk and the reflecting film is formed on the resultant surface so as to have the same arrangement as that of a CD (compact disk) or an LD (laser disk). However, concave and convex parts may be formed on a metal disk so as to have a structure allowing direct reflection. Alternatively, a rotary disk may be designed to transmit laser beams without a reflecting film. In this case, the intensities of transmitted laser beams are ready by a photodetector by using the phenomenon that the transmitted laser beams are shifted in phase by the concave and convex parts (differences in thickness) formed on the rotary disk and interfere with each other.

FIG. 7 shows an arrangement of still another embodiment of the present invention. A rotation detector of this embodiment is constituted by photodetector 10 and rotary disk 20. FIG. 7 shows an enlarged view of rotary disk 20 for the sake of a description. Reference numerals 11A and 11B denote laser diodes; 12, a beam splitter; 13, a collimator lens; 14, an objective lens; 15A and 15B, laser beams; and 16A and 16B, photodiodes.

Rotary disk 20 is coupled to the rotating shaft of a rotating object to be detected (not shown) and is rotated upon rotation of the rotating object. Reference numeral 21 denotes a plastic member; 22, slits; 23, a reflecting film; and 24, a protective film. Slits 22 are designed such that convex parts (which look like projections because FIG. 7 is a view seen from the opposite side to the surface in which the slits are formed), each having a depth of 0.11 μm, a width of 0.4 μm, and a proper length, are radially formed in one surface of plastic member 21 of rotary disk 20 at 1.5-μm intervals (each of the remaining convex parts has a width of 1.1 μm), and a reflecting film 23 is formed on the surface having the concave and convex parts.

A laser beam having a wavelength of about 0.78 μm emitted from laser diode 11 of photodetector 10 is transmitted through beam splitter 13 and is collimated by collimator lens 14. The collimated laser beam is then transmitted through objective lens 15 and is radiated onto rotary disk 20 from the opposite side to the surface having slits 22. The laser beam is adjusted by objective lens 15 so as to be focused on the position of slit 22. Laser beam 16 is focused to a size of about 1.4 μm at the position of slit 22.

The laser beam is then reflected by reflecting film 23 and returns to photodetector 10. The laser beam passes through objective lens 15 and collimator lens 14, and its direction is changed by beam splitter 13. The laser beam is finally guided to photodiode 18 to be converted into an electrical signal. When the center of laser beam 16 coincides with the center of the concave part of slit 22, since the spot size of the laser beam is about 1.4 μm which is not more than ½ the width (0.4 μm) of the concave part of the slit, laser beam components reflected by the concave and convex parts are mixed and return to photodetector 10. p The laser beam components reflected by the concave and convex parts have a difference in optical path length corresponding to twice the depth of the concave part. Since the depth (0.11 μm) of each concave part is set to be ¼ the wavelength of a laser beam which is transmitted through plastic member 21, laser beam components reflected by the concave and convex parts are 180° out of phase, and cancel each other upon interference. Therefore, the amount of laser beam components which return to photodetector 10 is greatly decreased, and the amplitude of an electrical signal obtained from photodiode 18 is decreased.

When the center of laser beam 16 coincides with the center of the part between the concave parts of slits 22, i.e., the convex part, since the convex part of the slit has a width of 1.1 μm which is almost equal to the spot size (1.4 μm) of the laser beam, most of the laser beam is reflected by the convex part and returns to photodetector 10. As a result, an electrical signal having a large amplitude is obtained from photodiode 16. In this manner, the concave and convex parts constituting slits 22 can be converted into electrical signals having large and small amplitudes and read by photodetector 10. In this case, an electrical signal whose amplitude changes once every time slit 22 is rotated by the slit interval (1.5 μm) upon rotation of rotary disk 20 can be obtained.

Similarly, a laser beam emitted from laser diode 12 of photodetector 10 is transmitted through beam splitter 13 and is collimated by collimator lens 14. The collimated laser beam is then transmitted through objective lens 15 and is radiated, as laser beam 17, onto rotary disk 20. The laser beam is then reflected by reflecting film 23 and returns to photodetector 10. The laser beam passes through objective lens 15 and collimator lens 14, and its direction is changed by beam splitter 13. The laser beam is finally guided to photodiode 19. An electrical signal corresponding to the concave and convex parts constituting each slit 22 can be obtained from photodiode 19.

Two laser beams 16 and 17 are radiated on rotary disk 20 so as to be separated from each other by a distance corresponding to ⅕ the interval (1/5 μm) of slits 22 in the circumferential direction. Therefore, electrical signals having a phase difference of 90° can be obtained from photodiodes 18 and 19, respectively, upon rotation of rotary disk 20. In the embodiment shown in FIG. 7, the interval between the two laser beams is assumed to be 1.5 μm × ¾ for the sake of a simple description. However, it is only required, in practice, that the interval between laser beam components in the circumferential direction is set to be N±¼ (N is an integer) the slit interval (1.5 μm).

In this embodiment, two independent laser diodes or photodiodes are used. However, a composite element (also called a laser diode array or photodiode array) is available and may be used. The composite element is designed such that a plurality of laser diodes or photodiodes whose characteristics are made highly uniform are formed in a single semiconductor chip at intervals of several tens μm.

Although the interval between laser beams from the composite laser diode cannot be adjusted, the interval between laser beams in the circumferential direction of the rotary disk may be adjusted to be N±¼ (N is an integer) the slit interval (1.5 μm).

If the light-receiving area of a composite photodiode is set to be relatively large, no adjustment corresponding to the adjustment of a composite laser diode is required.

Figure 8:
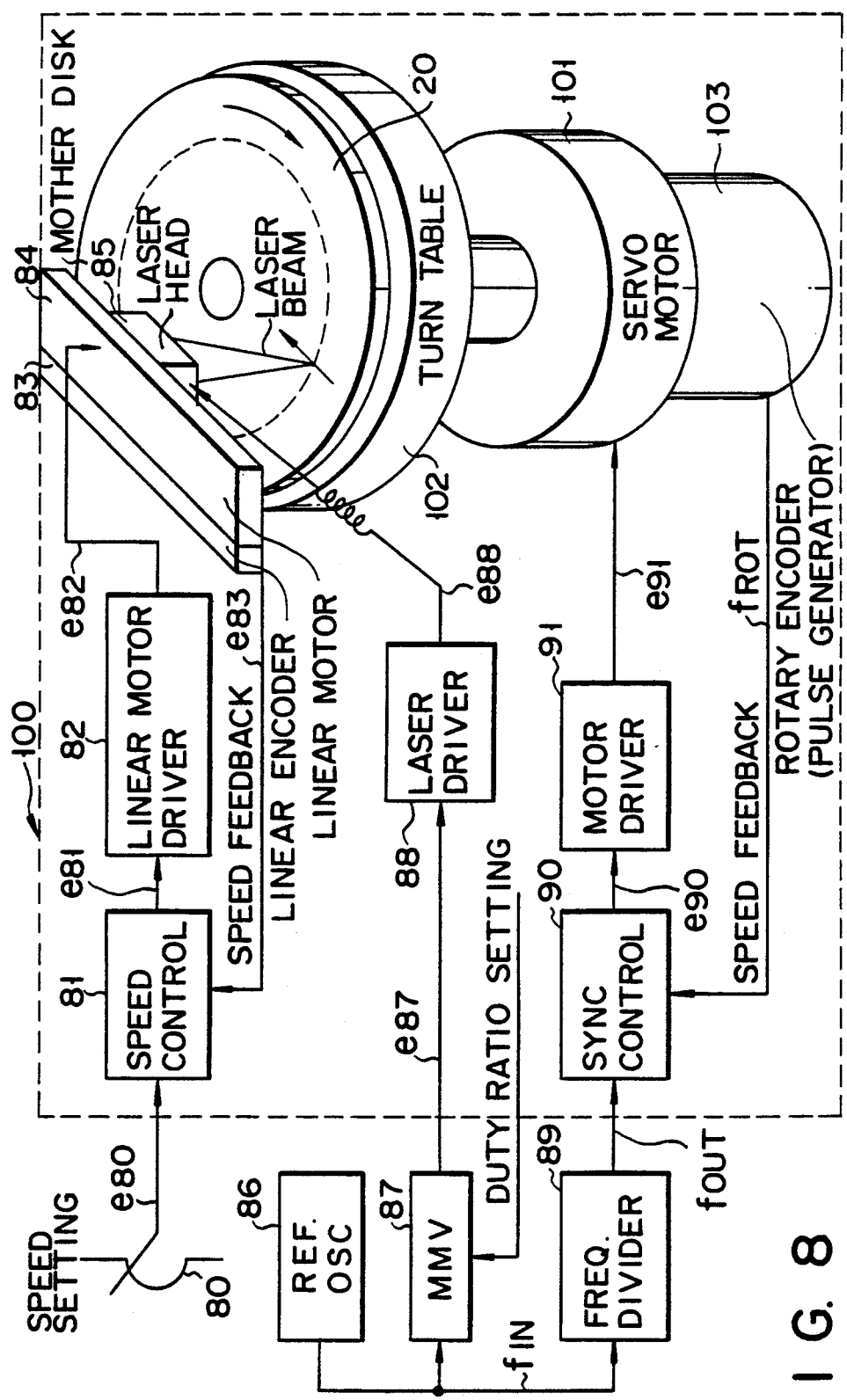
FIG. 8 is a block diagram showing an apparatus for forming an optical disk used for a rotation detector of the present invention.

FIG. 8 is a block diagram showing an arrangement of mother disk recording apparatus 100 for forming an optical disk used for the rotation detector of the present invention.

Mother disk 20 obtained by uniformly coating a photoresist material on a surface-polished glass disk is mounted and fixed on turn table 102 directly coupled to the rotating shaft of direct drive type servo motor 101.

The rotational speed (fROT) of servo motor 101 is detected by rotary encoder (rotation pulse generator) 103. Detected rotational speed signal fROT is fed back to synchronization control circuit (SYNC control) 90.

SYNC control 90 compares rotational speed fROT with predetermined comparison signal fOUT, and supplies error signal e90 corresponding to the difference between rotational speed fROT and comparison signal fOUT to motor driver 91. Motor driver 90 drives servo motor 101 so as to minimize error signal e90.

Comparison signal fOUT is obtained by frequency-dividing reference frequency signal fIN output from reference oscillator (REF. OSC) 86 at predetermined frequency division ratio N using frequency divider (FREQ. divider) 89. If the number of slits per rotation which are formed in mother disk 20 is Ns, and the number of pulses of rotational speed signal fROT per rotation of motor 101 is Np, frequency division ratio N is represented by the following equation:

$$N = Np/Ns \ldots \quad (1)$$

Movement control for laser head 85 for forming slits in mother disk 20 is performed in the following manner.

Laser head 85 is moved by linear motor 84 from the outer periphery to the inner periphery of turn table 10 with a precision on the order of submicrons. This movement is performed by linear motor 84 which is servo-controlled on the basis of position/speed detection by linear encoder 83.

More specifically, signal e83 representing the movement speed (or the position relative to mother disk 20) of laser head 85 is fed back from linear encoder 83 to speed control 81. Speed control 81 compares movement speed signal e83 with radial speed command e80, and supplies error signal e81 corresponding to the difference between speed signal e83 and speed command e80 to linear motor driver 82. Driver 82 drives linear motor 84 so as to minimize error signal e81. Note that radial speed command e80 is output from speed setting unit 80.

Drive control for laser head 85 for forming slits in mother disk 20 is performed in synchronism with rotation control for servo motor 101 in the following manner.

Reference frequency signal fIN output from REF. OSC 86 is input to monostable multivibrator (MMV) 87. MMV 87 generates pulse e87 having the same frequency as that of input signal fIN and predetermined duty ratio (the ratio of the low-level duration to the high-level duration in one cycle) DN.

MMV 87 is of a type capable of changing duty ratio DN. Duty ratio DN is determined in accordance with the slit width and slit interval of slits to be formed in mother disk 20. When, for example, disk 20 shown in FIG. 1 is to be formed, since the width of each slit 22 is 0.4 μm and the slit interval is 1.5 μm, duty ratio DN of MMV 87 is set to be 0.4/1.5 = 0.27 (27%).

Pulse e87 whose duty ratio DN is determined in this manner is input to laser driver 88. Driver 88 intermittently drives laser head 85 in accordance with duty ratio DN of pulse e87.

Since the inputs to MMV 87 and FREQ. divider 89 are identical, the laser intermittent drive is accurately synchronized with the rotation of motor 101. Laser head 85 is moved in the radial direction of turn table 102 on the order of submicrons (corresponding to 1/10 to ½ the width of each slit to be formed) while maintaining this rotation-synchronized intermittent drive so as to intermittently drive the laser always at equal angular intervals. As a result, a slit (pit) pattern shown in FIG. 1 is formed on mother disk 20.

Rotary disk 20 for the rotation detector of the present invention may be manufactured by substantially the same method as that of manufacturing a CD (compact disk) or an LD (laser disk).

In the manufacture of a CD (compact disk), a mother disk is formed first. A photoresist material is coated on a disk, such as a surface-polished glass, so as to have a uniform thickness. A laser beam which is focused by a lens to a size of about 0.5 μm is intermittently radiated onto the disk in accordance with a pit pattern to be recorded while the disk is rotated. At the same time, the laser beam is moved in the radial direction at a radial pitch (track pitch) of 1.6 μm per rotation of the disk. The pit pattern is formed, as exposure marks, on the photoresist material on the disk. When this pattern is developed, portions of the photoresist material corresponding to the pits are removed, and the pits are formed as concave parts, thus completing a the mother disk.

After the mother disk is plated with a metal such as nickel, the mother disk is removed to form the stamper of the mother disk. By using this stamper, a plastic member is formed by injection molding or the like so as to form a copy having concave and convex parts identical to those of the mother disk. Aluminum is then deposited on the surface having the concave and convex parts, and a reflecting film is formed on the resultant structure. In addition, a plastic protective film is formed on the reflecting film so as to complete a CD (compact disk).

A mother disk for the rotary disk of the present invention is formed as follows. By using the apparatus shown in FIG. 8, a laser beam is intermittently radiated, at a predetermined frequency, onto a disk obtained by uniformly coating a photoresist material on a base disk, such as a surface-polished glass. The rotational frequency of the disk is controlled by frequency-dividing this intermittent frequency so as to synchronize the intermittent frequency of a laser beam with the rotational frequency of the disk. The spot size of the laser beam is set to be about 0.4 μm, and the movement of the laser beam in the radial direction is set to be very small (about 0.1 μm). As a result, the laser beam is radiated on the disk a predetermined number of times and at predetermined intervals which are determined by the ratio of the intermittent frequency to the rotational frequency. When the disk is rotated once, a laser beam is radiated on it at substantially the same angular position but at a position slightly shifted (about 0.1 μm) from the preceding position in the radial direction.

Since this radial shift is small relative to the spot size of a laser beam (about 0.4 μm), the radiation area is continuous in the radial direction. Therefore, radial slits with respect to the center of the disk can be formed as exposure marks by repeating this radiation. The width of each slit can be controlled by controlling the ON intervals of laser beams. When the resultant slits are developed, a disk having slits consisting of concave and convex parts is completed. The concave/convex pattern can be reversed by changing the property of a photoresist material (to negative or positive).

Similar to the manufacture of a CD (compact disk), copies can be formed by using the above-described mother disk so as to manufacture rotary disks of rotation detectors in large quantities at low cost.

As has been described above, according to the present invention, a highly reliable rotation detector having a very high resolution which uses the technique of a CD (compact disk) or an LD (laser disk) can be obtained. Since tracking in the radial direction, which is required in an optical disk, is not required, the structure can be simplified, and the reliability of the rotation detector is greatly improved.

In addition, by properly selecting a relationship between the widths of the concave and convex ports constituting the slits and the spot size of the laser beam, an electrical signal whose amplitude greatly changes once every time the rotary disk is rotated by a degree corresponding to a slit interval can be obtained. At the same time, the slit interval can beredued to 1.5 μm, and hence a resolution more than 10 times that of the conventional optical pulse encoder can be obtained. Furthermore, the elements for an optical disk can be applied to most of the basic constituent elements of the present invention. Hence, similar to optical disks, rotary disks can be manufactured in large quantities, and a low-cost rotation detector having high resolution an reliability can be realized.

Note that it is easy to arrange a plurality of photodetectors in a rotation detector so as to generate twophase pulses or a pulse per rotation as in the conventional optical pulse encoder.

By properly selecting a relationship between the widths of concave and convex parts constituting slits and the spot size of the laser beam, an electrical signal whose amplitude greatly changes twice for every rotation of a rotary disk corresponding to a slit interval can be obtained.

In addition, according to the above-described embodiments of the present invention, a two-phase output rotation detector having a very high resolution and capable of discriminating a rotational direction, which uses the technique of a CD (compact disk) or an LD (laser disk), can be obtained. Unlike the conventional detector using a pair of photodetectors, this detector requires only one optical system. If a composite element is used for this detector, the structure can be simplified with the number of components remaining substantially the same as that of a one-phase output rotation detector. Therefore, the manufacturing cost can be decreased, and the reliability can be greatly improved.

Since the intervals between laser beams can be reduced to several tens μm, relative precision required for the intervals of laser beams in the radial direction can be decreased. Hence, the intervals can be easily adjusted. In addition, no consideration needs to be given to the chance that the intervals between laser diodes or photodiodes are mechanically changed with the lapse of time.

A two-phase output rotation detector having a resolution more than ten times that of the conventional optical pulse encoder can be obtained. If the rotation detector of the present invention is used to control a motor, the motor can be very smoothly rotated even at a low speed, and a very small rotational position can be controlled. Therefore, the field of industrial application of the rotation detector of the present invention is very wide.

The present invention has been described above with reference to its particular embodiments. However, the number of laser beams is not limited to two. A multiphase output rotational detector can be realized by using a larger number of laser beams. In order to form a plurality of laser beams, a laser beam emitted from one laser oscillator such as a laser diode may be divided by a half mirror or a diffraction grating.

What is claimed is:

1. An optical disk adapted to a rotation detector employing a combination of the optical disk and an optical pickup, said optical disk having front and rear surfaces comprising:
    means located on said rear surface of said optical disk for reflecting a coherent light beam emitted from the optical pickup and toward said rear surface, said light beam having a prescribed beam spot size; and
    a plurality of convex portions relative to said rear surface formed on said reflecting means,
    wherein each of said convex portion has a longitudinal shape whose longitudinal axis is directed to a rotational center of said optical disk such that said convex portions reflect the coherent light from said optical pickup;
    a distance of a space between adjacent two of said convex portions differs from a width of each said convex portion.

2. An optical disk according to claim 1, wherein a ratio of the width of each of said convex portions to the distance of a space between the adjacent two of said convex portions is selected to be substantially 2 or more.

3. An optical disk according to claim 1, wherein said optical pickup comprises:
    means for emitting a laser beam;
    means for converting an intensity of the laser beam into an electric signal; and
    means for feeding the laser beam from said emitting means to a place of said optical disk at which said convex portions pass through, and feeding the laser beam reflected at the place of said optical disk to said converting means.

4. An optical disk according to claim 1, wherein said optical pickup comprises:
    first emitter means for emitting a first laser beam;
    second emitter means for emitting a second laser beam;
    first converter means for converting an intensity of the first laser beams into a first electric signal;
    second converter means for converting an intensity of the second laser beams into a second electric signal;
    means for feeding the first laser beam from said first emitter means to a first place of said optical disk at which said convex portions pass through, feeding the second laser beam from said second emitter means to a second place of said optical disk at which said convex portions pass through and which is adjacent to said first place, feeding the first laser beam reflected at the first place of said optical disk to said first converter means, and feeding the second laser beam reflected at the second place of said optical disk to said second converter means.

5. An optical disk adapted to a rotation detector employing a combination of the optical disk and an optical pickup, said optical disk having front and rear surfaces comprising:
    means located on said rear surface of said optical disk for reflecting a coherent light beam emitted from the optical pickup and toward the rear surface of said optical disk, said light beam having a prescribed beam spot size; and
    a plurality of concave portions relative to said rear surface formed on said reflecting means,
    wherein each said concave portion has a longitudinal shape whose longitudinal axis is directed to a rotational center of said optical disk such that said concave portions reflect the coherent light beam from said optical pickup;
    a distance of a space between adjacent two of said concave portions differs from a width of each said concave portion.

6. An optical disk according to claim 5, wherein a ratio of the width of each said concave portion to the distance of a space between the adjacent two of said concave portions is selected to be substantially 2 or more.

7. An optical disk according to claim 5, wherein said optical pickup comprises:
    means for emitting a laser beam;
    means for converting an intensity of the laser beam into an electric signal; and
    means for feeding the laser beam from said emitting means to a place of said optical disk at which said concave portions pass through, and feeding the laser beam reflected at the place of said optical disk to said converting means.

8. An optical disk according to claim 5, wherein said optical pickup comprises:
    first emitter means for emitting a first laser beam;
    second emitter means for emitting a second laser beam;
    first converter means for converting an intensity of the first laser beams into a first electric signal;
    second converter means for converting an intensity of the second laser beams into a second electric signal;
    means for feeding the first laser beam from said first emitter means to a first place of said optical disk at which said concave portions pass through, feeding the second laser beam from said second emitter means to a second place of said optical disk at which said concave portions pass through and which is adjacent to said first place, feeding the first laser beam reflected at the first place of said optical disk to said first converter means, and feeding the second laser beam reflected at the second place of said optical disk to said second converter means.

9. A rotation detector comprising:
    a rotary disk having front and rear surfaces and concave and convex parts formed on the rear surface thereof, and an optical reading unit for reading said concave and convex parts with a laser beam emitted toward said rear surface such that said concave and convex parts reflect said laser beam, said concave and convex parts being radially arranged with respect to the center of said disk so as to form slits, said concave and convex parts constituting said slits having different widths, the width of one of said concave and convex parts which has a smaller width than the other being set to be smaller than a spot size of a laser beam radiated from said optical reading unit, and a signal whose amplitude changes once every time said rotary disk coupled to a rotating object to be detected is rotated by a degree corresponding to an interval between said slits being obtained from said optical reading unit.

10. An optical rotation detector comprising:
    a rotary disk having front and rear surfaces having concave and convex parts formed on the rear surface thereof, and an optical reading unit for reading said concave and convex parts with a laser beam emitted toward said rear surface such that said concave and convex parts reflect said laser beam, said concave and convex parts being radially arranged with respect to the center of said disk so as to form slits, said concave and convex parts constituting said slits having substantially the same width which is substantially equal to or larger than a spot size of a laser beam emitted from said optical reading unit, and a signal whose amplitude changes twice every time said rotary disk coupled to a rotating object to be detected is rotated by a degree corresponding an interval of said slits being obtained from said optical reading unit.

11. An optical rotation detector including a rotary disk having front and rear surfaces in which slits are recorded, said slits being constituted by concave and convex parts formed on said rear surface of said rotary disk, and an optical reading unit for radiating laser beams emitted from laser oscillators through optical systems so as to be focused onto surfaces of said slits such that said concave and convex parts reflected said laser beams, and reading said slits by converting the reflected laser beams into electrical signals alternately having large and small amplitudes, characterized in that a plurality of laser beams are radiated on said rotary disk through said optical systems of said optical reading unit, the respective laser beams are radiated onto different positions, in the circumferential direction, of said rotary disk, and a plurality of electrical signals having different phases can be obtained from said photodetector when said rotary disk coupled to a rotating object to be detected is rotated, thereby enabling discrimination of a rotational direction.

12. A detector according to claim 11, wherein the number of laser beams to be radiated onto said rotary disk is two, and two electrical signals, which are obtained from said optical reading unit when said rotary disk coupled to the rotating object is rotated, has a phase difference of 90°, so that a rotational direction can be discriminated.

* * * * *